United States Patent [19]
Spanke

[11] Patent Number: 5,402,256
[45] Date of Patent: Mar. 28, 1995

[54] OPTICAL TIME SLOT INTERCHANGER APPARATUS AND METHOD OF OPERATION

[75] Inventor: Ronald A. Spanke, Wheaton, Ill.

[73] Assignee: AT&T Corp., Murray Hill, N.J.

[21] Appl. No.: 221,310

[22] Filed: Mar. 31, 1994

[51] Int. Cl.$^6$ ............................................. H04S 14/08
[52] U.S. Cl. .................................... 359/140; 359/139
[58] Field of Search ............... 359/117, 128, 139, 140, 359/173; 370/68, 85.5

[56] References Cited

U.S. PATENT DOCUMENTS

| | | | |
|---|---|---|---|
| 4,166,212 | 8/1979 | Judeinstein | 359/140 |
| 4,922,479 | 5/1990 | Su | 370/1 |
| 4,991,975 | 2/1991 | Alferness et al. | 370/4 |
| 5,103,333 | 4/1992 | Koai | 359/140 |
| 5,105,292 | 4/1992 | Le Roy et al. | 359/117 |
| 5,115,428 | 5/1992 | Ramanan et al. | 370/68 |

FOREIGN PATENT DOCUMENTS

| | | | |
|---|---|---|---|
| 60-47588 | 5/1985 | Japan | H04B 9/00 |
| 0269595 | 11/1987 | Japan | 359/140 |

OTHER PUBLICATIONS

R. A. Thompson et al., "An Experimental Photonic Time-Slot Interchanger Using Optical Fibers as Reentrant Delay-Line Memories", *Journal of Lightwave Technology*, vol. LT-5, No. 1, Jan. 1987, pp. 154–162.

R. A. Thompson, "Architectures with Improved Signal-to-Noise Ratio in Photonic Systems with Fiber–Loop Delay Lines", *IEEE Journal on Selected Areas in Communications*, vol. 6, No. 7, Aug. 1988, pp. 1096–1106.

Primary Examiner—Richard F. Chilcot, Jr.
Assistant Examiner—Rafael Bacares
Attorney, Agent, or Firm—Jack R. Penrod

[57] ABSTRACT

An Optical Time Slot Interchange (OTSI) Apparatus that has relatively low optical fiber requirements and good attenuation and signal-to-noise characteristics. This OTSI uses parallel feedback (PFB) to provide the delays. This PFB OTSI can be implemented with an n×n optical crossbar switch. The PFB OTSI is conditionally, i.e., rearrangeably, non-blocking for 16×16 crossbar switch implementations if a controller using the control method of the invention is also included.

16 Claims, 4 Drawing Sheets (PRIOR ART)
FIG. 1

OPTICAL TIME SLOT INTERCHANGER APPARATUS AND METHOD OF OPERATION

FIELD OF THE INVENTION

This invention relates to optical systems and more particularly to an optical time slot interchanger (OTSI) and a method for operating the OTSI to provide a non-blocking routing for for all possible time slot interchange permutations of a data frame.

BACKGROUND OF THE INVENTION

Figure 1:
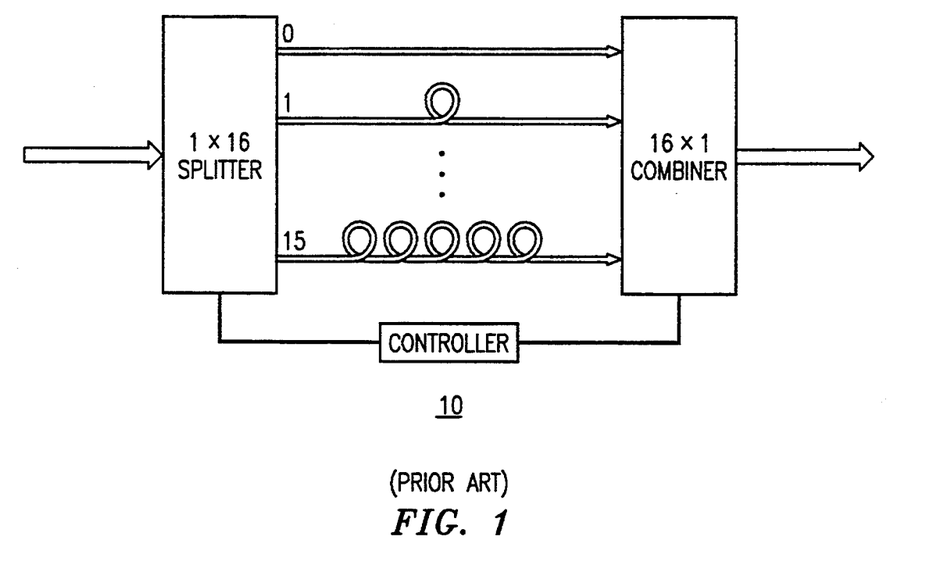
FIG. 1 is a block diagram of a known OTSI that requires a considerable length of optical fiber to implement.

Previously known optical time slot interchangers tended to fall into two widely separated categories. At one extreme is the optical fiber intensive 1×n splitter/n×1 combiner OTSI, known as a loopless architecture from the article "Architectures with Improved Signal-to-Noise Ratio in Photonic Systems with Fiber-Loop Delay Lines" by R. A. Thompson, published August 1988 in IEEE JOURNAL ON SELECTED AREAS IN COMMUNICATIONS. It is called loopless because there is no looping back or re-circulation used in obtaining the delays. This type of OTSI has n individual lengths of optical fiber, the shortest being a one time slot delay and the longest being an n slot delay. The length of each of the n fibers being one slot time longer than the previously shorter delay, for example 1, 2, 3 . . . n-1, n. The loopless architecture provides an OTSI for a frame of N time slots. For n=16, the largest possible frame would have 8 time slots for a frame integrity maintaining OTSI and the total of all fiber delays would be 136 time slot periods. Such an OTSI is shown as system 10 in FIG. 1.

At the other extreme is the single stage Thompson Re-entrant memory loop design which was able to achieve any of N possible delays for N time slots by implementing n separate delays of one time slot each. Delays greater than one time slot are provided by switching circuits recirculating the signals of the time slot within its respective delay fiber. N delays are required under the worst case condition of delaying the first slot of data for N-1 slot times and inserting it at the end of the frame. Such an OTSI is shown as system 20 in FIG. 2 and is also described in the above referenced article.

Figure 2:
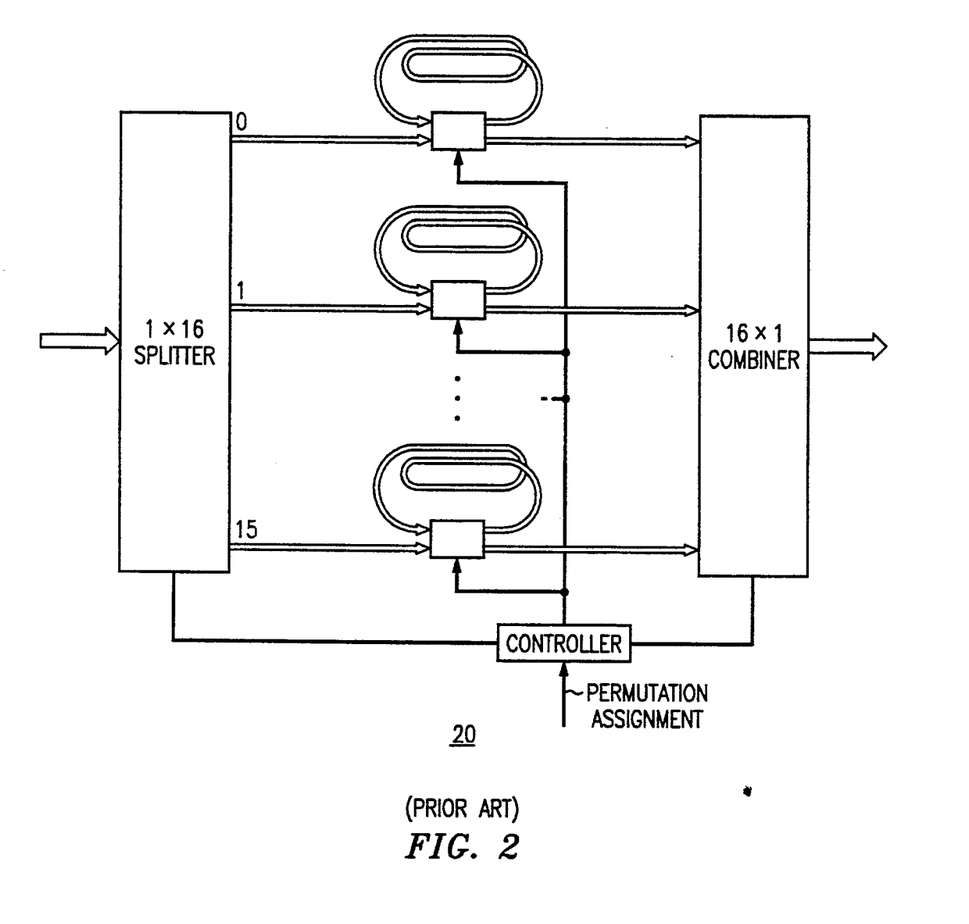
FIG. 2 is a block diagram of a known OTSI that requires a minimal total length of optical fiber to implement.

The Thompson Reentrant type of OTSI 20, however, has significant attenuation and SNR limitations because the signals of some time slots are looped through the same delay fibers and their associated switching elements up to N times. During each circulation, the optical signals of the particular time slot being delayed are attenuated by the attenuation of the delay fiber and are subjected to an insertion loss of the switching element. These attenuation and SNR limitations cause this OTSI architecture to be considered by many to be impractical, even though it uses the smallest amount of optical fiber of any of the OTSI architectures.

Thus, there is a need in the art for an N time slot OTSI that has few fiber delays and yet does not have severe attenuation and switching losses. An N time slot OTSI supports all delays between 0 time slots and N-1 time slots and supports all interchange permutations of time slots within a frame, including the worst case of all N time slots being delayed by N-1 time slot positions. This means that the total fiber length must be capable of storing N-1 time slots of information simultaneously, in addition to providing a maximum delay of N-1 time slots. Additionally, the total fiber delay must provide combinations that deliver every possible delay between 0 and N-1 time slots without the signals of any two time slots requiring the same delay fiber simultaneously.

It is an object of the present invention to provide an N time slot OTSI that has the desired characteristics listed above and is constructed with the minimum total length of optical fiber.

It is another object of the present invention to provide an N time slot OTSI that is constructed with the minimum length of fiber without the signals of any slot re-circulating through the same delay fiber and associated switching elements twice.

It is another object of the invention to provide an N time slot OTSI that is capable of supporting all permutations of time slots in a frame, the worst case being that all N time slots are to be delayed by N-1 time slot position, which means that the total fiber length must be capable of storing N-1 time slots of information simultaneously in addition to providing a maximum delay of N-1 time slots.

It is another object of the present invention to provide an OTSI in which the total length of fiber is partitioned in a manner to achieve combinations that deliver every possible delay between 0 and N-1 time slots without the signals of any time slot re-circulating through the same delay fiber and associated switching elements twice.

SUMMARY OF THE INVENTION

Briefly stated in accordance with one aspect of the invention the aforementioned objects are achieved by providing an OTSI that achieves a delay fiber length of N-1 time slots and also uses a low number of delay fibers to provide any desired delay permutation between 0 and N-1 time slots. Additionally, this OTSI has good attenuation and SNR characteristics because it does not re-circulate the signals of any time slot through a delay fiber and its respective delay fiber input-output switch elements. This OTSI is non-blocking if re-circulation of a time slot through any delay fiber is prohibited.

In a specific embodiment the aforementioned objects are achieved by providing a parallel feedback optical time slot interchanger (OTSI) that includes an n×n optical switch having n inputs and n outputs, where n is an integer greater than 2. An input optical fiber is connected to one of the n inputs. An output fiber is connected to one of the n outputs. Each of the remaining n-1 outputs is connected to one end of a respective delay fiber of a plurality of n-1 delay fibers. A second end of each of the n-1 delay fibers is connected to a respective input of the remaining n-1 inputs. A controller for controlling the optical switch switches the signals of each time slot of a frame through the delay fibers in such a manner to provide a non-blocking path to the output at the predetermined time.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying figures in which:

DETAILED DESCRIPTION

Figure 3:
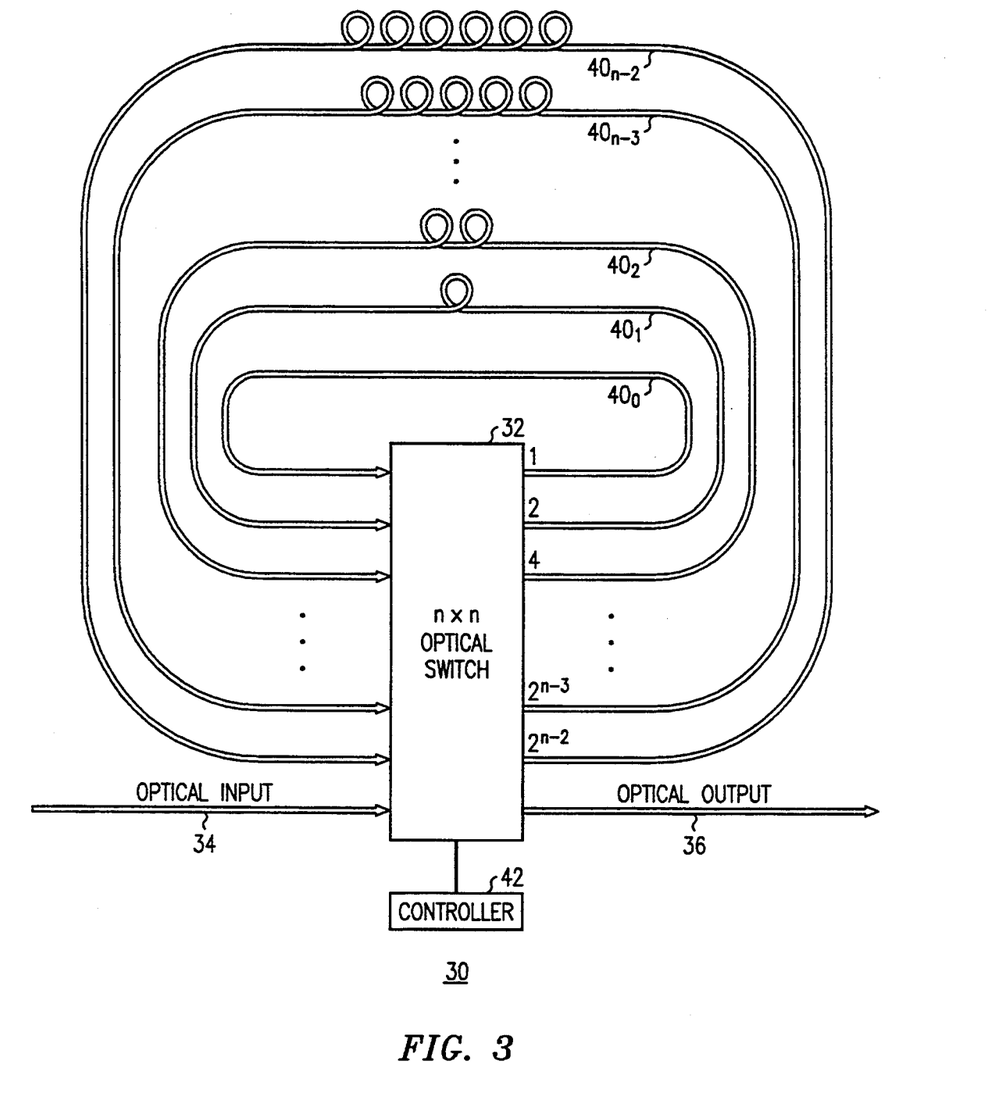
FIG. 3 is a block diagram of an OTSI according to one embodiment of the present invention.

Referring now to FIG. 3, a parallel feedback (PFB) OTSI 30 is shown. PFB OTSI 30 has an $n \times n$ optical crossbar switch 32. An input optical fiber 34 is connected to one of the n inputs and an optical fiber output 36 is connected to one of the n outputs. The remaining n-1 inputs and n-1 outputs are connected to lengths of optical fibers $40_0$-$40_{n-2}$. The n-1 optical fibers have progressively longer binary delay lengths from 1 to N/2 time slots, where N is the number of time slots in a frame. The number of time slots per data frame that can be processed by PFB OTSI 30 is (n-1)=integer($\log_2 N$) or $N = 2^{(n+1)}$. From these expressions, if n=8, then the greatest N can be is 128 and if n=16, then the greatest that N can be is 32768.

The worst case time slot permutation is to interchange the data signals of the first slot with the signals of the last of the N slots. That is a delay of N-1 time slots. To obtain this delay, the signal that initially is in the first time slot must pass through each of the n-1 delay fibers $40_0$-$40_{n-2}$.

PFB OTSI 30 has an advantage in that all of its optical switching elements are implemented on a single moderately sized substrate. Optical space switches of dimensions $8 \times 8$ have been realized, such as the switch described in "Strictly Non-Blocking $8 \times 8$ Integrated Optical Switch Matrix," by P Granestrad, et al., published in Electronics Letters, Vol. 22, No. 15, pages 816-818, Jul. 17, 1986. Optical space switches of dimensions $16 \times 16$ should soon be commercially available. A $16 \times 16$ switch might be fabricated in one device with 16 fiber inputs and 16 fiber outputs on an edge, which could easily be achieved with the present technology. The PFB OTSI 30 according to the present invention has been proved to be non blocking for n less than or equal to 16. That is, all possible permutations of time slot interchanges can be provided. The PFB OTSI's with n greater than 16 are believed to be non blocking, i.e., the architecture should be upwardly scalable from the $8 \times 8$ and $16 \times 16$ versions, but the simulations to prove that they are non blocking have not been performed.

The PFB OTSI 30 has a controller 42 that routes the signal of each input time slot through its respective delay fiber(s) to achieve each pre-determined time slot interchange permutation. Controller 42 switches the connections of $n \times n$ switch 32 during the guard band periods between time slots to accomplish this routing. The controller 42 is provided with the desired permutation of time slots for the next frame sufficiently ahead of the arrival of the data frame to permit the controller 42 to determine in which order the particular delay fibers $40_0$-$40_{n-2}$ are to be traversed to generate the required delay. Typically, the required permutation is the same for each subsequent frame, so the controller only needs to be updated as to where the permutation is changed. A particular delay may require a certain delay fiber at a particular instance in time when that delay fiber was already occupied by another signal. In such a case, the order of the delays for one signal is rearranged such that both signals could be routed with each signal ultimately receiving the correct total delay. Because such rearrangements are made to resolve potential routing blocks, the PFB OTSI 30 is classified as a rearrangeably non blocking OTSI.

The control method of controller 42 to achieve the required time slot permutation is not trivial for the PFB OTSI 30. The control method for determining which signals are assigned to what delays at which points in time to achieve the desired permutation without blocking are often complex.

Consider the simple example of an 8 time slot (N=8) OTSI 30 is implemented using a $4 \times 4$ switch (n=4) with delay fibers of 1, 2, and 4 time slots. The OTSI 30 is to perform an arbitrary permutation, for example: $\Pi$ which is defined as $\Pi_1=7$; $\Pi_2=4$; $\Pi_3=2$; $\Pi_4=5$; $\Pi_5=8$; $\Pi_6=6$; $\Pi_7=1$; and $\Pi_8=3$.

The first step of the control method is to determine the required delays for each input time slot, $D_i$. Each delay is determined by subtracting the starting position of the time slot from the final position of the time slot using mod N arithmetic yields: Delay $(D_i) = \Pi_i - i(\bmod N)$.

Applying this delay expression to the above example permutation $\Pi$, the delay expressions are:
$D_1 = 7-1 = 6$; $D_2 = 4-2 = 2$; $D_3 = 2-3 = 7$;
$D_4 = 5-4 = 1$; $D_5 = 8-5 = 3$; $D_6 = 6-6 = 0$;
$D_7 = 1-7 = 2$; and $D_8 = 3-8 = 3$ The next step of the control method is to break each required delay into the elemental set of delay fibers required, i.e., a delay of 6 requires fibers {2,4}. These delay fibers may be entered in any order just so long as they are both traversed to give a total delay of 6. The elemental fiber set for input i is denoted $E_i$. The required elemental fibers, $E_i$, for the example permutation $\Pi$, are given by: $E_1=\{4,2\}$; $E_2=\{2\}$; $E_3=\{4,2,1\}$; $E_4=\{1\}$; $E_5=\{2,1\}$; $E_6=\{\text{NULL}\}$; $E_7=\{2\}$; and $E_8=\{2,1\}$.

The next step of the control method is to construct a delay table listing all $\log_2 N$ delay fibers, and the output fiber for each of the N time slots. This table may be filled out manually, or, as is typically done, formed in an array of storage positions in memory within the controller 42. When completed, this table shows which signal is entering which delay fiber on which time slot (TS). To avoid blocking, no two signals are allowed to enter the same delay fiber during the same time slot.

Referring now to Table I, for any time slot that requires two or more delay elements, the delay elements can be traversed in any order. However, for any time slot, which requires only a single delay element, the particular fiber that must be entered on a particular time slot is fixed. Continuing the example for permutation $\Pi$, time slot 7 required a single delay element of 2, therefore the fiber delay line 2 must be entered by signal 7 on time slot 7. This is shown by placing a 7 (signal 7) in delay fiber 2 for time slot 7. This will emerge from delay fiber 2 at time slot 1 (really time slot 7+2 mod 8), at which time it must be placed on the output fiber 36. This is shown in the table by placing signal 7 on the output fiber during time slot 1. This step of the control method fills in the delay table with all delays which are single elements. That is because the other ways of achieving an equivalent delay would break the rule against a signal re-circulating through a delay fiber two or more times. This step also includes filling in the single elements all the way to the output fiber portion of the table, since according to the non re-circulation role there is no choice but to assign the delay in this fashion. Applying first steps of the control method to permutation , time slots 2, 4, and 7 require only a single delay element, and time slot 6 requires the output immediately, therefore, after the required entries are filled in to the delay table, the delay table looks like Table I shown below

TABLE I

| Delay | Time slot | | | | | | | |
|---|---|---|---|---|---|---|---|---|
| Fiber | 1 | 2 | 3 | 4 | 5 | 6 | 7 | 8 |
| 4 | | | | | | | | |
| 2 | | 2 | | | | | 7 | |
| 1 | | | | 4 | | | | |
| Output | 7 | | | 2 | 4 | 6 | | |

After the assignments of the single possibility elements of the permutation are fixed, the control method begins to fill in the remaining elements which all have multiple possibilities. However choosing one of the possibilities for one element set, may block another element set. Thus, the control method proceeds with a strategy of finding a non-blocking routing.

The next step of the control method is to determine the number of assignment possibilities for each delay with multiple elements. For a delay with n elements in the set, there are $\{n \times (n+1)\}/2$ possible ways for the signals to be routed through the delay fibers. These possibilities for each time slot requiring multiple elements are then consecutively numbered. In the example of permutation , time slot 3 has delay 7 with elements {4,2,1}. There are 6 ways for the signals of time slot 3 to traverse the elements {4,2,1} as shown below 1. Delay 4 in TS 3, then delay 2 in TS 7, then delay 1 in TS 1
2. Delay 4 in TS 3, then delay 1 in TS 7, then delay 2 in TS 8
3. Delay 2 in TS 3, then delay 4 in TS 5, then delay 1 in TS 1
4. Delay 2 in TS 3, then delay 1 in TS 5, then delay 4 in TS 6
5. Delay 1 in TS 3, then delay 4 in TS 4, then delay 2 in TS 8
6. Delay 1 in TS 3, then delay 2 in TS 4, then delay 4 in TS 6

In this example, $E_3$ has 6 possibilities, and $E_1$, $E_5$, and $E_8$ all have 2 possibilities. The total number of possible combinations that may have to be tried is the product of the number of possibilities of each of the multiple element delays. For the above example, the possible combinations is given by: $6 \times 2 \times 2 \times 2 = 48$ combinations.

The assignment by the control method begins by selecting the first possibility for the first time slot, i.e., {4,2}. The delay table is tentatively filled in with this value, i.e., a 1 is placed on delay fiber 4 for time slot 1, then a 1 is placed on delay fiber 2 in time slot 5, then a 1 is placed in the output in time slot 7. The control method then selects the first possibility for the second time slot, and attempts to populate the delay assignment table in the same fashion. If successful, then the first possibility for the third time slot is selected and the individual delays are tentatively placed into the table. This control method attempts to proceed through all time slots, and if the final time slot is reached and the method successfully places the final time slot into the delay table, then the permutation is routed.

It is very likely, that before the last time slot is reached, the first possibility for one of the time slots cannot be routed because the delay fiber is already taken for that time slot. In this situation, the control method increments to the next possibility for that time slot. If any possibility for that time slot is able to be routed, then the method continues with the next time slot as before. However, if all possibilities are exhausted for that time slot before a successful routing is found, the control method backs up to the previous time slot and increments the possibility number. With the new possibility in the previous time slot, the control method starts over with the first possibility in the present time slot. The control method continues, and since the architecture is non blocking for a 4×4 OTSI there exists at least one set of possibilities which yields a valid routing.

Continuing with the example of the permutation , the first possibility {4,2} for TS 1 is selected. The first possibility {4,2,1} for TS 3 is attempted, however delay 2 is already occupied in time slot 7, as shown in Table I, so this possibility does not work. The second possibility {4,1,2 } is attempted and is found to be routable. Next, the first numbered possibility {2,1} for TS 5 is attempted, however delay 1 is already taken in time slot 7. The second numbered possibility {1,2} for TS 5 is attempted and is found to be routable. Finally the first numbered possibility {2,1} for TS 8 is attempted. However, delay 2 is already taken in time slot 8. Therefore, the second numbered possibility {1,2} for TS 8 is attempted and is found to be routable. Filling in Table I with all these non-blocking routes results in Table II, shown below, which is a valid, non-blocking delay assignment table for the permutation .

TABLE II

| Delay | Time slot | | | | | | | |
|---|---|---|---|---|---|---|---|---|
| Fiber | 1 | 2 | 3 | 4 | 5 | 6 | 7 | 8 |
| 4 | 1 | . | 3 | . | . | . | . | . |
| 2 | 8 | 2 | . | . | . | 5 | 7 | 3 |
| 1 | . | . | . | 4 | 5 | . | 3 | 8 |
| Output | 7 | 3 | 8 | 2 | 4 | 6 | 1 | 5 |

In this example, one of the possibilities for each time slot was always routable so the controller 42 was not required to back up to the previous time slot. Depending on the overall permutation selected, the controller 42 may have to back up frequently.

The control method described above is easily implemented via a computer program. A computer program can be written to implement the above control method in C or some other language. Such a program has been used to verify that all possible permutations for a 4×4 OTSI, an 8×8 OTSI and a 16×16 OTSI can be routed by following the control method of the present invention. The number of possible output permutations for a 16×16 OTSI is sixteen factorial (16!) which equals 20,922,789,888,000 permutations. The complete routing verification for the 16×16 PFB OTSI was verified during a 4 week run on a dedicated work station Referring now to FIG. 4, a second embodiment of the invention is described. This second embodiment has the same control method as the PFB OTSI 32 shown in FIG. 3.

Figure 4:
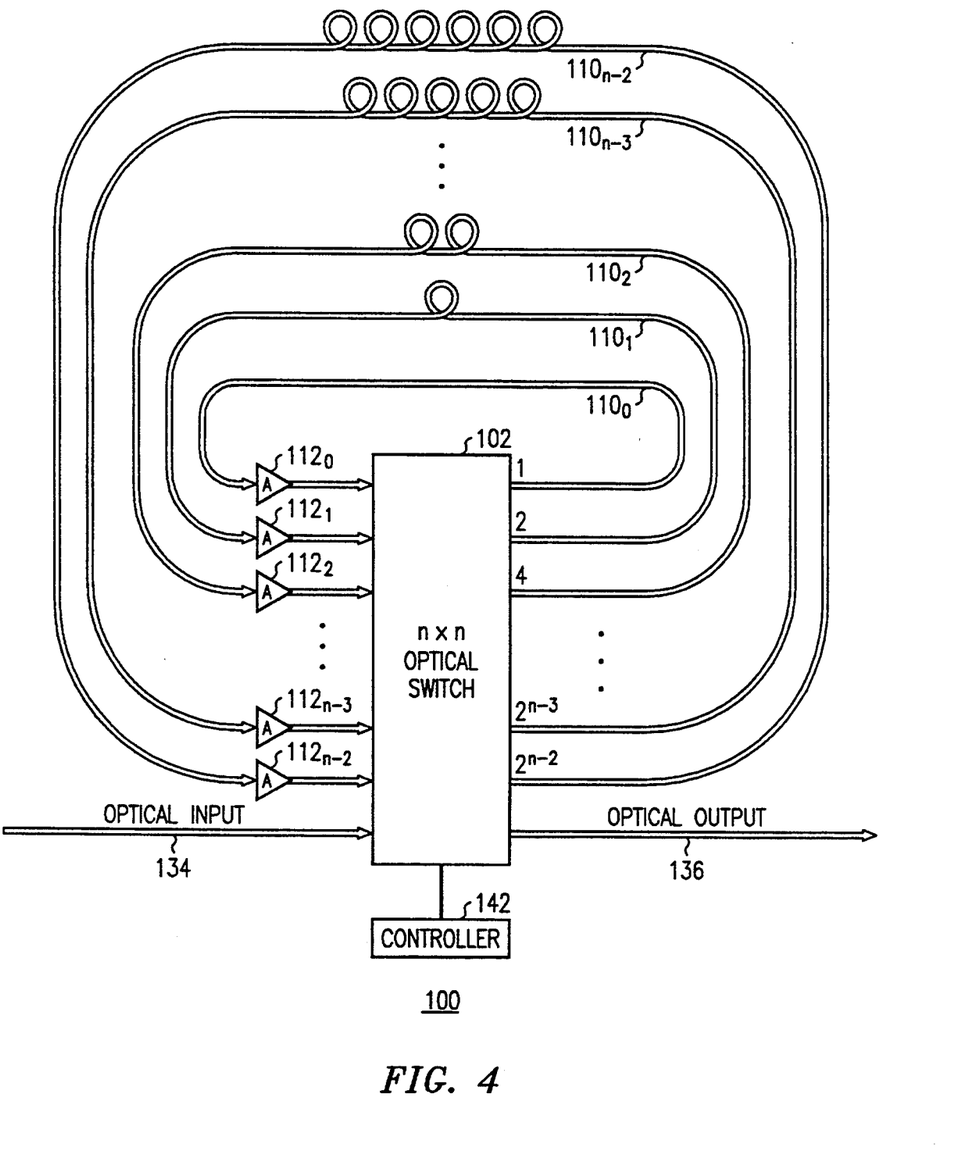
FIG. 4 is a block diagram of an OTSI according to another embodiment of the present invention.

Because the PFB OTSI 100 only requires the theoretical minimum number of optical fibers $110_0$-$110_{n-2}$, the PFB architecture lends itself easily to the addition of optical amplifiers $112_0$-$112_{n-2}$, such as erbium doped fiber amplifiers. Relatively few ($\log_2 N$) optical amplifiers are required in the system to allow the system to achieve very large sizes in terms of time slots. The addition of optical amplifiers $112_0$-$112_{n-2}$ eases the worst case insertion loss requirement to only needing to pass through the switch substrate once plus the worst case of N/2 time slots of fiber delay. But more important, the addition of optical amplifiers, completely eliminates any differential attenuation problem in the PFB architecture and thereby produces an output data frame in which the rearranged time slot signals are all of equal intensities. Whereas, optical amplifiers can be added to any OTSI architecture, the PFB OTSI architecture is particularly well suited to their use because of the low numbers of amplifiers that are required to achieve high switch dimensions.

Thus, it will now be understood that there has been disclosed a parallel feedback optical time slot interchanger uses a very low amount of optical fiber and has good attenuation and signal-to-noise characteristics. While the invention has been particularly illustrated and described with reference to preferred embodiments thereof, it will be understood by those skilled in the art that various changes in form, details, and applications may be made therein. For example, this architecture should be scalable to larger sizes of switches than 16×16. Although the proofs for modifications larger than 16×16 have not yet been performed, the method of proving that PFB OTSI's using switches larger than 16×16 is clearly given by the present invention. It is accordingly intended that the appended claims shall cover all such changes in form, details and applications which do not depart from the true spirit and scope of the invention.

What is claimed as new and desired to be secured by Letters Patent of the United States is:

1. An OTSI for interchanging at least one time slot of data of a plurality of time slots, comprising:
   a n×n optical switch, where n is an integer greater than 2;
   an input optical fiber connected to a first of the n inputs of the n×n optical switch;
   an output fiber connected to a first of the n outputs of the n×n optical switch;
   a plurality of up to n-1 optical delay fibers, each of the optical fibers having one end connected to an output of the remaining n-1 outputs of the n×n optical switch and a second end connected to a respective input of remaining n-1 inputs of the optical switch; and
   means for controlling said optical switch so that a given time slot is routed from said first input through at least one of the delay fibers and out to said first output.

2. The OTSI as set forth in claim 1, wherein said controlling means provides routing for all data slots of a data frame.

3. The OTSI of claim 2 wherein
   The OTSI as set forth in claim 1, wherein said controlling means provides non-blocking routing for all data slots of a data frame.

4. The OTSI of claim 1, wherein said n×n optical switch is a crossbar switch.

5. The OTSI as set forth in claim 1, further comprising a plurality of optical amplifiers, each of said optical amplifiers is connected to a respective fiber of said delay fibers.

6. The OTSI as set forth in claim 5, wherein n is 8.
7. The OTSI as set forth in claim 5, wherein n is 16.
8. The OTSI as set forth in claim 1, wherein n is 8.
9. The OTSI as set forth in claim 1, wherein n is 16.

10. The OTSI as set forth in claim 1, wherein there are N time slots, to a data frame, with N being equal to the number 2 raised to the n-1 power.

11. The OTSI as set forth in claim 10, wherein each of the optical delay fibers is an integer multiple of the time period of one of the N time slots.

12. The OTSI as set forth in claim 10, wherein each of the optical delay fibers is a power of two times the time period of one of the N time slots from two to the zero power to two to the n-2 power, respectively.

13. A method for routing each slot of a frame through an n×n parallel feedback OTSI having n-1 of the n outputs connected back through respective delay fibers to n-1 of the n inputs with at least two of the slots being permuted, comprising the steps of:
   determining a delay for each input time slot, respectively by subtracting Mod N a starting position of each time slot from a final position of each time slot
   separating each respective delay into an elemental set of fiber delays required to provide the respective delay
   assigning each elemental delay of each signal to a fiber delay line on a given time slot such that no two signals can enter the same delay fiber during the same time slot.

14. The method of claim 13 where said assignment includes
   constructing a delay assignment table listing all $\log_2 N$ delay fibers, and the output fiber for each of the N time slots which lists which signal is entering which delay fiber during which time slot with the constraint that no two signals can enter the same delay fiber during the same time slot to prevent blocking;
   listing into said table each signal that can be met by a single fiber delay at the time required;
   determining the number of assignment possibilities for each delay with multiple elements to traverse the fiber delays;
   selecting a first possibility for the first time slot and tentatively filling in the delay table with this value;
   selecting a first possibility for the second time slot, and attempting to fulfill its delay requirements by tentatively filling in the delay table with this second value;
   selecting a first possibility for the third time slot and tentatively placing the individual delays into the delay table; and
   proceeding through each subsequent time slot, and if the final time slot is successfully entered into the delay table, making the tentative selections final for the routing of this permutation.

15. The method as set forth in claim 14, further comprising the steps of:
   if before the final time slot is successfully routed, the first possibility for one of the time slots cannot be routed because a delay fiber is already taken for that time slot, selecting a next possibility for that time slot;
   if any possibility for that time slot is able to be routed, tentatively selecting that routing and entering it in the delay table;
   proceeding through each subsequent time slot, and if the final time slot is successfully entered into the delay table making the tentative selections final for the routing of this permutation.

16. The method as set forth in claim 15, further comprising the steps of:

if all possibilities are exhausted for a time slot before a successful routing can be found, backing up to the previous time slot and tentatively selecting a next possibility thereof;

with this next possibility tentatively selected in the previous time slot, selecting a first possibility of the present time slot;

if any possibility for that time slot is able to be routed, tentatively selecting that routing and entering it in the delay table;

proceeding through each subsequent time slot, and if the final time slot is successfully entered into the delay table making the tentative selections final for the routing of this permutation.

* * * * *

UNITED STATES PATENT AND TRADEMARK OFFICE
CERTIFICATE OF CORRECTION

PATENT NO. : 5,402,256
DATED : March 28, 1995
INVENTOR(S) : Ronald A. Spanke

It is certified that error appears in the above-indentified patent and that said Letters Patent is hereby corrected as shown below:

Column 7, line line 55, claim 3, delete "The OTSI of claim 2 wherein".

Signed and Sealed this

Fifteenth Day of August, 1995

Attest:

BRUCE LEHMAN

Attesting Officer

Commissioner of Patents and Trademarks

Disclaimer 5,402,256—Ronald A. Spanke, Wheaton, Ill. OPTICAL TIME SLOT INTERCHANGER APPARATUS AND METHOD OF OPERATION. Patent dated March 28, 1995. Disclaimer filed August 12, 1997, by the assignee, Lucent Technologies Inc.

Hereby enters this disclaimer to claims 1, 2, 3, 4, 5, 6, 7, 8, 9, 10, 11 and 12 of said patent.
*(Official Gazette, November 4, 1997)*